United States Patent
Yang

(10) Patent No.: US 12,309,526 B2
(45) Date of Patent: May 20, 2025

(54) VIDEO IMAGE TRANSMISSION METHOD, DEVICE, INTERACTIVE INTELLIGENT TABLET AND STORAGE MEDIUM

(71) Applicants: GUANGZHOU SHIYUAN ELECTRONICS CO., LTD., Guangdong (CN); GUANGZHOU SHIZHEN INFORMATION TECHNOLOGY CO., LTD., Guangdong (CN)

(72) Inventor: Ming Yang, Guangdong (CN)

(73) Assignees: Guangzhou Shiyuan Electronics Co., LTD., Guangzhou (CN); Guangzhou Shizhen Information Technology Co., LTD., Guangzhou (CN)

( * ) Notice: Subject to any disclaimer, the term of this patent is extended or adjusted under 35 U.S.C. 154(b) by 484 days.

(21) Appl. No.: 17/417,550

(22) PCT Filed: Dec. 24, 2019

(86) PCT No.: PCT/CN2019/127770
§ 371 (c)(1),
(2) Date: Jun. 23, 2021

(87) PCT Pub. No.: WO2020/151443
PCT Pub. Date: Jul. 30, 2020

(65) Prior Publication Data
US 2022/0051024 A1    Feb. 17, 2022

(30) Foreign Application Priority Data
Jan. 23, 2019 (CN) .......................... 201910063004.7

(51) Int. Cl.
H04N 7/14 (2006.01)
G06F 18/25 (2023.01)
(Continued)

(52) U.S. Cl.
CPC ........... *H04N 7/147* (2013.01); *G06F 18/251* (2023.01); *G06F 18/253* (2023.01); *G06N 3/08* (2013.01);
(Continued)

(58) Field of Classification Search
None
See application file for complete search history.

(56) References Cited

U.S. PATENT DOCUMENTS 9,210,372 B2   12/2015  Wang et al.
2011/0260998 A1  10/2011  Ludwig
(Continued)

FOREIGN PATENT DOCUMENTS

CN   101141608 A   3/2008
CN   102271241 A   12/2011
(Continued)

OTHER PUBLICATIONS

DeepSIC: Deep semantic image compression, by Luo et al., arXiv:1801.09468v1, Jan. 29, 2018 (Year: 2018).*
(Continued)

*Primary Examiner* — Vikkram Bali
(74) *Attorney, Agent, or Firm* — Zhong Law, LLC

(57) ABSTRACT

The present application relates to a video image transmission method, device, an interactive intelligent tablet and a storage medium. The method comprises: acquiring a video image captured by a first video communication end; acquiring semantic information in the video image; and sending the semantic information to a second video communication end, wherein the semantic information is used to reconstruct a reconstruction image of the video image at the second video communication end.

23 Claims, 4 Drawing Sheets

(51) Int. Cl.

| | | |
|---|---|---|
| *G06N 3/08* | (2023.01) | |
| *G06V 10/82* | (2022.01) | |
| *G06V 20/40* | (2022.01) | |
| *G06V 40/10* | (2022.01) | |
| *G06V 40/16* | (2022.01) | |
| *H04N 7/15* | (2006.01) | |

(52) U.S. Cl.
CPC .............. *G06V 10/82* (2022.01); *G06V 20/41* (2022.01); *G06V 40/107* (2022.01); *G06V 40/16* (2022.01); *G06V 40/174* (2022.01); *H04N 7/155* (2013.01)

(56) References Cited

U.S. PATENT DOCUMENTS

| | | | |
|---|---|---|---|
| 2013/0322513 A1* | 12/2013 | Law | G06T 9/20 375/E7.026 |
| 2014/0184721 A1 | 7/2014 | Zhang et al. | |
| 2016/0286097 A1* | 9/2016 | Singh | H04N 1/648 |
| 2018/0131950 A1 | 5/2018 | Guo et al. | |
| 2018/0367752 A1 | 12/2018 | Donsbach et al. | |
| 2020/0162751 A1* | 5/2020 | Kim | H04N 19/14 |

FOREIGN PATENT DOCUMENTS

| | | |
|---|---|---|
| CN | 103517072 A | 1/2014 |
| CN | 103647922 A | 3/2014 |
| CN | 104396234 A | 3/2015 |
| CN | 105120195 A | 12/2015 |
| CN | 106210612 A | 12/2016 |
| CN | 106454277 A | 2/2017 |
| CN | 106559636 A | 4/2017 |
| CN | 107977634 A | 5/2018 |
| CN | 108449569 A | 8/2018 |
| CN | 109831638 A | 5/2019 |
| JP | 2014529233 A | 5/2014 |
| JP | 2015521454 A | 7/2015 |
| JP | 2016537922 A | 12/2016 |
| JP | 2018201198 A | 12/2018 |
| KR | 20120044732 A | 5/2012 |
| KR | 20130022434 A | 3/2013 |
| KR | 20130110441 A | 10/2013 |
| KR | 20160021146 A | 2/2016 |
| WO | 2015090147 A1 | 6/2015 |
| WO | 2018061173 A1 | 4/2018 |

OTHER PUBLICATIONS

International Application No. PCT/CN2019/127770, International Search Report and Written Opinion mailed Mar. 17, 2020, 16 pages.
Chinese Application No. 201910063004.7, Chinese Office Action mailed Mar. 24, 2020, 28 pages.
Chinese Application No. 201910063004.7, Chinese Office Action mailed Jun. 24, 2020, 24 pages.
Dalal et al., "Histograms of Oriented Gradients for Human Detection," IEEE Computer Society Conference on Computer Vision and Pattern Recognition, 2005, pp. 1-8.
Zhang et al., "FaceBoxes: A CPU Real-time Face Detector with High Accuracy," IEEE International Joint Conference on Biometrics, arXiv:1708.05234v4 [cs.CV], 2017, pp. 1-9.
Mikolajczyk et al., "Human detection based on a probabilistic assembly of robust part detectors," Research Gate, 2010, pp. 1-15.
Zhang et al., "Joint Face Detection and Alignment using Multi-task Cascaded Convolutional Networks," IEEE Signal Processing Letters, 2016, pp. 1-5.
Indian Application No. 202117033300, Indian Office Action mailed Jul. 4, 2022, 6 pages.
Australian Examination report for AU Patent Application No. 2019424397, dated Jul. 18, 2022.
European search report for EU Application No. 19911814.2, dated Apr. 22, 2022.
Indian Examination report for IN Patent Application No. 202117023534, dated Apr. 29, 2022.
Japanese Notice of Reasons for Rejection for JP Patent Application No. 2021-542217, dated Aug. 16, 2022.
Korean Notice of Preliminary Rejection for KR Patent Application No. 10-2021-7021786, dated Dec. 12, 2022.
Indian Examination report for IN Patent Application No. 202117033300, dated Jan. 14, 2025.

* cited by examiner

VIDEO IMAGE TRANSMISSION METHOD, DEVICE, INTERACTIVE INTELLIGENT TABLET AND STORAGE MEDIUM

CROSS-REFERENCE TO RELATED APPLICATIONS

The present application is the U.S. national stage of PCT/CN2019/127770 filed on Dec. 24, 2019, which claims the priority benefit to Chinese Application No. 201910063004.7 filed to CNIPA on Jan. 23, 2019. The entire contents of the above-mentioned applications are incorporated by reference in the present application.

TECHNICAL FIELD

The present application relates to the technical field of image processing technology, and in particular to video image transmission in video communication, device, system, an interactive intelligent tablet and a storage medium.

BACKGROUND

With the development of network technology and demand growth, users require higher picture quality in video communication, including resolution requirements, fidelity requirements and real-time transmission requirement. For example, in a video conference, real-time interaction is a prerequisite for a good user experience. At the same time, the video image is required to have a high resolution, and important image information (such as human face details, body movement details, etc.) need to be preserved as much as possible.

In the process of implementing the present application, the applicants found that, in order to ensure that the video image achieves high resolution and high fidelity in related technologies, the compression rate of video images at the sending end needs to be reduced, and consequently, a large amount of image data needs to be transmitted through the network, causing low data transmission efficiency and no guarantee for real-time transmission. If real-time transmission is guaranteed, it is generally necessary to increase the compression rate of video images using a lossy compression technology, resulting in serious loss of video image information, which cannot meet requirements of the high resolution and high fidelity of the image in video communication.

Therefore, the current transmission solutions of video images in video communication cannot achieve all the requirements of high resolution, high fidelity, and real-time transmission.

SUMMARY

On the basis of this, to solve the situation where the relevant video image transmission technologies cannot achieve all the requirements of high resolution, high fidelity, and real-time transmission provided are a video image transmission method, device, system, an interactive intelligent tablet and a storage medium.

A first aspect of the present application provides a video image transmission method, comprising: acquiring a video image captured by a first video communication end; extracting semantic information of the video image; and sending the semantic information to a second video communication end, wherein the semantic information is used to reconstruct a reconstruction image of the video image at the second video communication end.

In one embodiment, the step of extracting the semantic information in the video image includes: extracting the semantic information of the video image by a trained encoder, wherein the encoder is configured to recognize image semantic information.

In one embodiment, the input of the encoder is an image, and the output of the encoder is a low-dimensional vector corresponding to the input image, the low-dimensional vector serving as the semantic information of the input image.

In one embodiment, the encoder is a convolutional neural network.

In one embodiment, the semantic information in the video image includes any one of the following: semantic information of a preset object in the video image, and global semantic information of the video image.

In one embodiment, the step of extracting the semantic information of the preset object in the video image includes: recognizing the preset object in the video image to obtain a sub-image of the preset object, inputting the sub-image of the preset object into the trained encoder, and acquiring the output of the encoder to obtain the semantic information of the preset object in the video image.

In one embodiment, the preset object includes a human face or a human body.

In one embodiment, if the preset object is a human face, the step of extracting the semantic information of the preset object in the video image includes: recognizing a human face area in the video image to obtain a human face sub-image, inputting the human face sub-image into the trained encoder, and acquiring the output of the encoder to obtain semantic information of the human face in the video image.

In one embodiment, if the preset object is a human body, the step of extracting the semantic information of the preset object in the video image includes: recognizing a human body area in the video image to obtain a human body sub-image, inputting the human body sub-image into the trained encoder, and acquiring the output of the encoder to obtain semantic information of the human body in the video image.

In one embodiment, the step of extracting the global semantic information in the video image includes: inputting the video image into the trained encoder, and acquiring the output of the encoder to obtain the global semantic information in the video image.

In one embodiment, the method further comprises: sending a first reference image to the second video communication end by using a preset image transmission mode at intervals of N frames, wherein the data volume of the first reference image transmitted in the preset image transmission mode is greater than that of the semantic information, N is greater than 1, the first reference image belongs to a video image captured by the first video communication end, the first reference image is used to enable the second video communication end to reconstruct the reconstruction image of the video image according to the semantic information and the first reference image.

In one embodiment, if the semantic information is the semantic information of the preset object, the first reference image is used to enable the second video communication end to obtain a reconstructed sub-image of the preset object according to the received semantic information, and fuse the reconstructed sub-image with the first reference image to obtain the reconstruction image of the video image.

In one embodiment, if the semantic information is the global semantic information, the first reference image is used to enable the second video communication end to obtain an initial reconstruction image according to the received semantic information, and fuse the initial reconstruction image with the first reference image to obtain the reconstruction image of the video image.

In one embodiment, if the semantic information is the semantic information of the preset object, the method further comprises: acquiring position information of the preset object in the video image, and sending the position information to the second video communication end, wherein the position information is used to enable the second video communication end to fuse the reconstructed sub-image of the preset object with the first reference image according to the position information to obtain the reconstruction image of the video image.

In one embodiment, the method further comprises: sending a second reference image to the second video communication end by using a preset image transmission mode, wherein the data volume of the second reference image transmitted in the preset image transmission mode is greater than that of the semantic information, the second reference image is at least one of an image of the preset object and an environment image of the first video communication end, the second reference image is used to enable the second video communication end to reconstruct the reconstruction image of the video image according to the semantic information and the second reference image.

A second aspect of the present application provides a video image transmission method, comprising: receiving semantic information of a video image, wherein the video image is a video image captured by a first video communication end; reconstructing an image according to the semantic information to obtain a reconstruction image of the video image; and displaying the reconstruction image through a display screen of a second video communication end.

In one embodiment, the step of reconstructing an image according to the semantic information to obtain the reconstruction image of the video image includes: reconstructing a reconstruction image of the video image according to the semantic information and an image reconstructed by a pre-trained decoder.

In one embodiment, the input of the decoder is the image semantic information, and the output of the decoder is an image reconstructed based on the input semantic information.

In one embodiment, the decoder is a convolutional neural network.

In one embodiment, the semantic information of the video image includes any one of the following: semantic information of a preset object in the video image, and global semantic information of the video image. In one embodiment, the preset object includes a human face or a human body.

In one embodiment, the step of reconstructing an image according to the semantic information to obtain the reconstruction image of the video image includes: acquiring a first reference image received using a preset image transmission mode in the most recent time, wherein the first reference image is a video image captured and sent by the first video communication end, the data volume of the first reference image received using the preset image transmission mode is greater than that of the semantic information; and reconstructing an image according to the semantic information and the first reference image to obtain the reconstruction image of the video image.

In one embodiment, the method further comprises: receiving the first reference image from the first video communication end using the preset image transmission mode at intervals of N frames, wherein N is greater than 1.

In one embodiment, if the semantic information is the semantic information of the preset object, the step of reconstructing an image according to the semantic information and the first reference image to obtain the reconstruction image of the video image includes: inputting the semantic information into the trained decoder, acquiring the output of the decoder to obtain a reconstructed sub-image of the preset object, and fusing the reconstructed sub-image of the preset object with the first reference image to obtain the reconstruction image of the video image.

In one embodiment, if the semantic information is global semantic information of an image, the step of reconstructing an image according to the semantic information and the first reference image to obtain the reconstruction image of the video image includes: inputting the semantic information into the trained decoder, acquiring the output of the decoder to obtain an initial reconstruction image, and fusing the initial reconstruction image with the first reference image to obtain the reconstruction image of the video image.

In one embodiment, the method comprises: if the semantic information is the semantic information of a human face, the output of the decoder is acquired to obtain a reconstructed sub-image of the human face; if the semantic information is semantic information of a human body, the output of the decoder is acquired to obtain a reconstructed sub-image of the human body.

In one embodiment, the method further comprises: receiving position information sent by the first video communication end, wherein the position information is the position information of the preset object in the video image, the step of fusing the reconstructed sub-image of the preset object with the first reference image to obtain the reconstruction image of the video image includes: fusing the reconstructed sub-image of the preset object with the first reference image according to the position information to obtain the reconstruction image of the video image.

In one embodiment, the step of receiving position information sent by the first video communication end includes: receiving first position information sent by the first video communication end, wherein the first position information is the position information of a human face area in the video image; and receiving second position information sent by the first video communication end, wherein the second position information is the position information of a human body area in the video image.

In one embodiment, before the step of fusing the reconstructed sub-image of the preset object with the first reference image according to the position information, the method further comprises: performing edge feathering processing on the reconstructed sub-image of the preset object.

In one embodiment, the step of reconstructing an image according to the semantic information to obtain the reconstruction image of the video image includes: acquiring a second reference image received using the preset image transmission mode, wherein the second reference image is at least one of an image of the preset object and an environment image of the first video communication end, the data volume of the second reference image received using the preset image transmission mode is greater than that of the semantic information; and reconstructing an image according to the semantic information and the second reference image to obtain the reconstruction image of the video image.

A third aspect of the present application provides a video image transmission method, comprising: a first video communication end acquires a captured video image, acquires semantic information of the video image, and sends the semantic information to a second video communication end; and the second video communication end receives the semantic information, reconstructs an image according to the semantic information to obtain a reconstruction image of the video image, and displays the reconstruction image through a display screen of the second video communication end.

A fourth aspect of the present application provides a video image transmission device, comprising: an image acquiring module, configured to acquire a video image captured by a first video communication end; an information extracting module, configured to extract semantic information of the video image; and a sending module, configured to send the semantic information to a second video communication end, wherein the semantic information is used to reconstruct a reconstruction image of the video image at the second video communication end.

In one embodiment, the information extracting module is configured to extract the semantic information of the video image using a trained encoder, and the encoder is configured to recognize image semantic information.

In one embodiment, the input of the encoder is an image, and the output of the encoder is a low-dimensional vector corresponding to the input image, the low-dimensional vector serving as the semantic information of the input image.

In one embodiment, the semantic information in the video image includes any one of the following: semantic information of a preset object in the video image, and global semantic information of the video image.

In one embodiment, the device further comprises: a first reference image sending module, configured to send a first reference image to the second video communication end by using a preset image transmission mode at intervals of N frames, wherein the data volume of the first reference image transmitted in the preset image transmission mode is greater than that of the semantic information, N is greater than 1, the first reference image belongs to a video image captured by the first video communication end, the first reference image is used to enable the second video communication end to reconstruct the reconstruction image of the video image according to the semantic information and the first reference image.

In one embodiment, the device further comprises: a second reference image sending module, configured to send a second reference image to the second video communication end by using a preset image transmission mode, wherein the data volume of the second reference image transmitted by using the preset image transmission mode is greater than that of the semantic information, the second reference image is at least one of an image of the preset object and an environment image of the first video communication end, the second reference image is used to enable the second video communication end to reconstruct the reconstruction image of the video image according to the semantic information and the second reference image.

A fifth aspect of the present application provides a video image transmission device, comprising: an information receiving module, configured to receive semantic information of a video image, wherein the video image is a video image captured by a first video communication end; an image reconstructing module, configured to reconstruct an image according to the semantic information to obtain a reconstruction image of the video image; and an image displaying module, configured to display the reconstruction image on a display screen of a second video communication end.

In one embodiment, the image reconstructing module is configured to reconstruct an image according to the semantic information and a pre-trained decoder to obtain the reconstruction image of the video image.

In one embodiment, the semantic information of the video image includes any one of the following: semantic information of a preset object in the video image, and global semantic information of the video image.

In one embodiment, the image reconstructing module includes: a first reference image acquiring sub-module, configured to acquire a first reference image received by using a preset image transmission mode in the most recent time, wherein the first reference image is a video image captured and sent by the first video communication end, the data volume of the first reference image received by using the preset image transmission mode is greater than that of the semantic information; and a first image reconstructing sub-module, configured to reconstruct an image according to the semantic information and the first reference image to obtain the reconstruction image of the video image.

In one embodiment, the device further comprises: a first reference image receiving sub-module, configured to receive the first reference image from the first video communication end by using the preset image transmission mode at intervals of N frames, wherein N is greater than 1.

In one embodiment, the image reconstructing module includes: a second reference image acquiring sub-module, configured to acquire a second reference image received by using a preset image transmission mode, wherein the second reference image is at least one of an image of the preset object and an environment image of the first video communication end, the data volume of the second reference image received by using the preset image transmission mode is greater than that of the semantic information; and a second image reconstructing sub-module, configured to reconstruct an image according to the semantic information and the second reference image to obtain the reconstruction image of the video image.

A sixth aspect of the present application provides a video image transmission system, comprising a first video communication end and a second video communication end, wherein the first video communication end and the second video communication end are in a video communication connection, the first video communication end is configured to acquire a captured video image, acquire semantic information of the video image, and send the semantic information to the second video communication end, the second video communication end is configured to receive the semantic information, reconstruct an image according to the semantic information to obtain a reconstruction image of the video image, and display the reconstruction image on a display screen of the second video communication end.

A seventh aspect of the present application provides an interactive intelligent tablet, comprising a photography device, a display screen, a memory and a processor, wherein a computer program is stored in the memory, the interactive intelligent tablet captures a video image using the photography device, when executing the program, the processor is configured to extract semantic information of the video image captured by the photography device, and send the semantic information to other interactive intelligent tablet, when executing the program, the processor is further configured to receive semantic information of a video image sent by other interactive intelligent tablet, reconstruct an image according to the semantic information to obtain a reconstruction image of the video image sent by other interactive intelligent tablet, and display the reconstruction image on the display screen.

A eighth aspect of the present application provides a computer-readable storage medium, wherein a computer program is stored on the computer-readable storage medium, and when the program is executed by a processor, the steps of any one of video image transmission method in the above-mentioned embodiments is implemented.

DESCRIPTION OF THE PREFERRED EMBODIMENTS

Hereinafter, the present application will be described in detail with reference to the drawings and embodiments. It should be understood that the concrete embodiments described herein are only used to explain the present application, and are not used to limit the present application.

"Embodiments" mentioned in the present application means that a specific feature, structure, or characteristic described in conjunction with the embodiments may be included in at least one embodiment of the present application. The appearance of the phrase in various places in the description does not necessarily refer to the same embodiment, nor an independent or alternative embodiment mutually exclusive with other embodiments. Those skilled in the art clearly and implicitly understand that the embodiments described in the present application can be combined with other embodiments.

Figure 1:
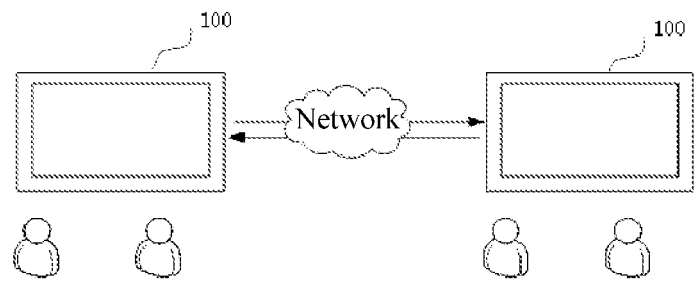
FIG. 1 is a diagram of a system environment to which a video image transmission method is applicable according to an embodiment.

A video image transmission method provided in the present application can be applied to a system environment as shown in FIG. 1, in which at least two computer devices 100 are connected through network communication. The computer device 100 can be a laptop computer, a cellular phone, a camera phone, an intelligent phone, a personal digital assistant, a navigation device, an interactive intelligent tablet, a wearable device, an intelligent locomotive, other intelligent home devices, or any combination of these devices.

In the embodiment of the present application, the computer device 100 is installed with application software for realizing video communication, such as video conference software, instant communication software, etc. Through such application software, video communication can be established between at least two computer devices 100. In the video communication, any computer device 100 not only serves as a sending end of video images to send frame images of the video collected by this end to other computer devices 100, but also serves as a receiving end of video images to receive and display frame images of the video sent by other computer devices 100.

In addition, the computer device 100 may further be installed with other applications, such as text editing applications, document presentation applications, instant communication applications, image editing applications, social applications, e-commerce applications, search applications, browser applications, etc. Thereinto, examples of text editing applications include electronic whiteboard applications and electronic blackboard applications, and examples of document presentation applications include wireless screen projection applications.

In some embodiments, an interactive intelligent tablet can be used as an example of a computer device. The interactive intelligent tablet can be an integrated device that controls the content displayed on the display tablet by using touch technology and realizes human-computer interaction. The interactive intelligent tablet integrates one or more functions selected from the group including a projector, an electronic whiteboard, a screen curtain, a stereo, a TV, and a video conference terminal, etc. The display screen of the interactive intelligent tablet is a touch screen, and the touch screen can include a capacitive screen, an electromagnetic screen and an infrared screen, etc. The touch screen can receive touch operations input by a user through a finger or an input device. Thereinto, the input device includes, but is not limited to, a capacitive pen, an electromagnetic pen and/or infrared pen, etc.

Figure 2:
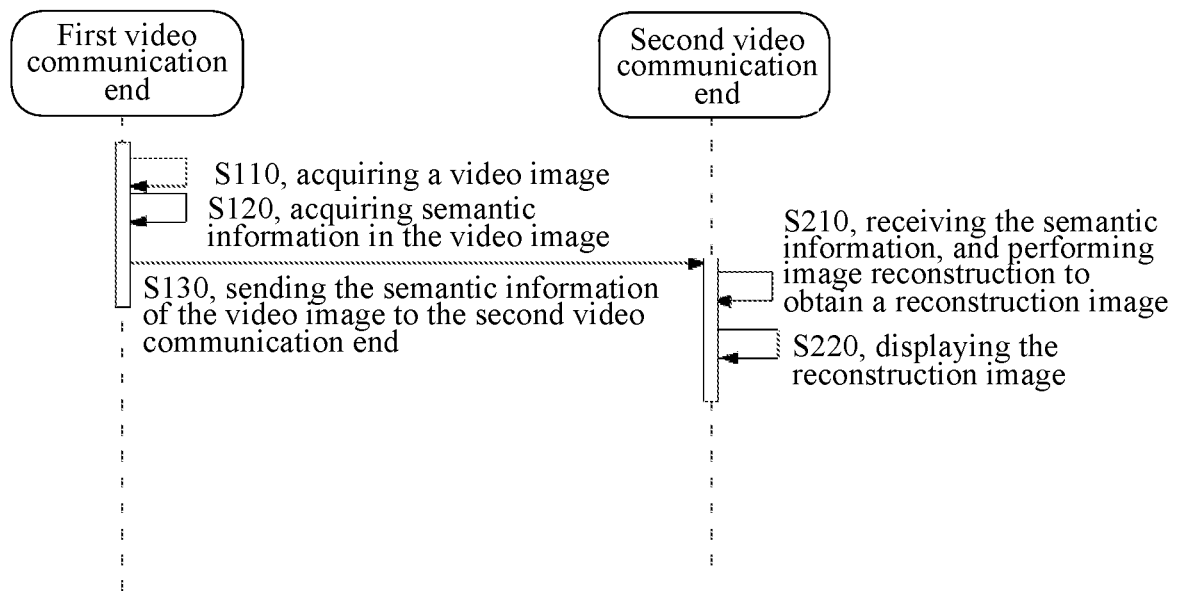
FIG. 2 is a schematic flowchart of a video image transmission method according to an embodiment.

In one embodiment, a video image transmission method is provided. With reference to FIG. 2, the method includes the following steps of:

S110, a first video communication end acquires a video image. The video image is a frame image in a video captured by the first video communication end.

A video communication, such as a video conference, a video call, etc., generally transmits a video image in frames, wherein the first video communication end is a terminal that needs to transmit the video image in the video communication, and can be understood as the sending end of the video image. The video image acquired by the first video communication end is a video image in a video conference or video call scene captured by the photography device of the first video communication end.

In the video communication, each video communication end not only needs to transmit a video image to other video communication ends, but also needs to receive a video image from other video communication ends. Therefore, in the video communication, the first video communication end can be any terminal participating in video communication.

S120, the first video communication end extracts semantic information in the video image.

An image includes many pixels, and the semantic is pixel information in the image. Acquiring the semantic information in the image can be understood as extracting deep feature information of the image pixels, which can characterize important details in the video image. For example, in a video image of a video conference, the semantic information may include facial expression feature information and physical behavior feature information of people participating in the conference, or conference environment information, such as information of table, chair, etc., in a conference room.

In some embodiments of the present application, the semantic information acquired from the video image can be either the semantic information of the preset object (human face, human body, table, chair, etc.) in the image, or the global semantic information of the image, such as key pixel feature information of the image, etc.

S130, the first video communication end sends the semantic information to a second video communication end.

Compared with all the information included in the video image, the data volume of the semantic information acquired from the video image is small, so that it can be beneficial to realize the real-time transmission of the video image.

S210, the second video communication end receives the semantic information sent by the first video communication end, and performs image reconstruction according to the semantic information to obtain a reconstruction image of the video image.

Thereinto, compared with traditional encoding compression and reconstruction based on shallow information of an image, image compression and image reconstruction based on the semantic information of the image can retain more image details, so that images in video communication can take into account the requirements for high fidelity and real-time performance.

S220, the second video communication end displays the reconstruction image.

Through the video image transmission method of the above-mentioned embodiment, in video communication, when the sending end needs to transmit a video image, the semantic information of the video image is acquired, and the semantic information is sent to the receiving end. After the receiving end receives the semantic information, the video image of the sending end can be reconstructed according to the semantic information, thereby obtaining a reconstruction image, and the reconstruction image is displayed on the display screen of the receiving end. On the one hand, in video communication, the transmission of one video image only needs to transmit a very small data volume, which has very low network bandwidth requirements and can meet the requirements of real-time transmission. On the other hand, by compressing and restoring video images based on the semantic information, the receiving end of the video image can reconstruct an image with higher quality, and concurrently satisfy the requirements for images with high resolution and high fidelity in video communication.

Figure 3:
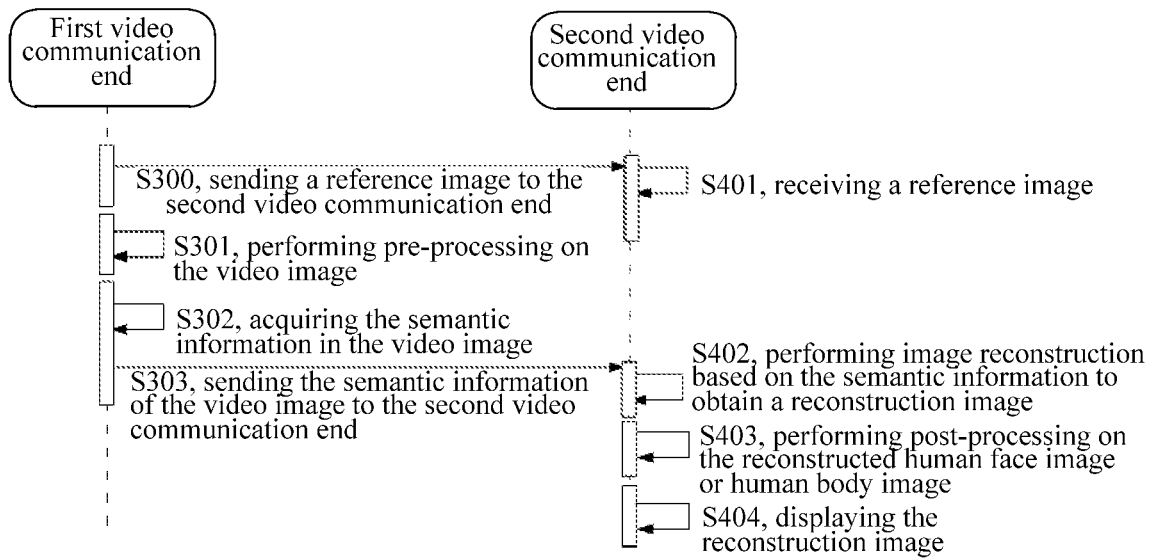
FIG. 3 is a schematic flowchart of a video image transmission method according to another embodiment.

In one embodiment, taking a video conference as an example, a local user and a remote user participate in a video conference through the first video communication end and the second video communication end, respectively. The first video communication end captures a video image of the local user during the conference. As the video image to be transmitted, with reference to FIG. 3, the realization process of transmitting the video image from the first video communication end to the second video communication end is as follows:

Step S302, at the first video communication end, extracting the semantic information of the video image.

At the first video communication end, the semantic information of the video image can be extracted by using a pre-trained encoder. In some embodiments, a convolutional neural network can be used as the encoder. The input of the encoder is a video image to be transmitted, and the output of the encoder is a low-dimensional vector corresponding to the video image.

The encoder can also be regarded as a conversion function f, and the conversion function f can convert the video image I to be transmitted into a low-dimensional vector y, that is, $y=f(I)$. Thereinto, y is the semantic information of the video image I, y can be a 64-dimensional or 128-dimensional vector which can sufficiently capture the most important information in the video image in a video conference, thereby realizing high-quality image reconstruction and at the same time, reducing the data volume required for transmission.

As such, the low-dimensional vector and semantic information in the embodiments of the present application include information extracted by using learning from the video image in the video conference scenarios, and can characterize the important details in the video image. This information is different than semantic information in other scenarios. In particular, the low-dimensional vectors and semantic information in the embodiments of the present application are not feature information as understood by human thinking. Instead, they are deep image information that cannot be captured by human thinking.

Step S303, the first video communication end transmits the extracted semantic information to the second video communication end.

Since the semantic information y of the video image I only needs a very small volume of data to represent, for example: if the semantic information y is a 64-dimensional floating point number vector, each frame of the video image only needs to transmit data of 64*4=256 byte. If the frame rate of the video is 30 Hz, the required bandwidth is 256*30=7680 Bps=7.68 KBps. It can be seen that this image transmission mode has low bandwidth requirements for the network environment.

In step S402, the second video communication end receives the semantic information, and performs image reconstruction based on the semantic information to obtain a reconstruction image of the video image of the first video communication end.

After the second video communication end receives the semantic information y, the second video communication end may use the semantic information y as an input of a pre-trained decoder, and perform image reconstruction through the decoder. Thereinto, the decoder can be regarded as a conversion function g, and the conversion function g can convert the low-dimensional semantic information y into a reconstruction image I', that is, $I'=g(y)$.

In one embodiment, the encoders and decoders in the above described embodiments may satisfy the following conditions: they are suitable for video conference scenarios, the encoder f can perform compact coding on video images and output low-dimensional semantic information, and the decoder g can restore the most important information (such as facial expression details, body movement details, etc.) in the video image, so as to obtain a high-quality reconstruction image.

Figure 4:
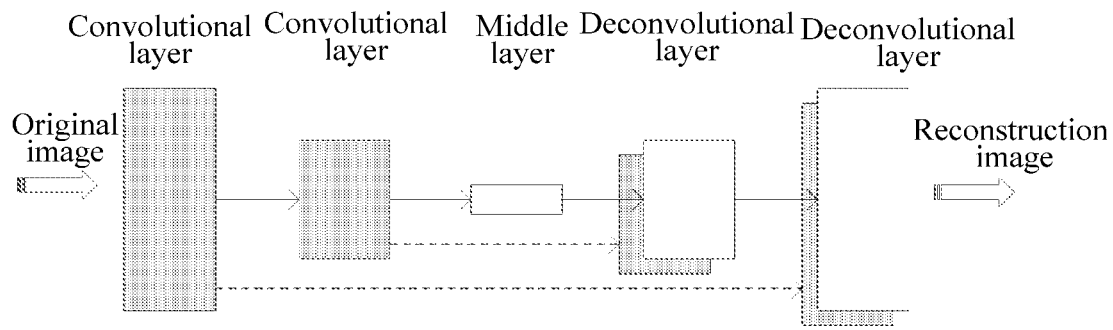
FIG. 4 is a schematic diagram of a model for constructing an encoder and a decoder according to an embodiment.

In some embodiments, with reference to FIG. 4, the encoder f and the decoder g can be designed based on the Encoder-decoder network, wherein the left side (i.e., the lower layer of the network) includes a series of convolution operation layers (although the figure only shows two layers as an example, and other numbers of convolution operation layers can be set in actual situations), the middle layer outputs a low-dimensional vector, and this part is equivalent to the encoder. The low-dimensional vector is transmitted to the remote end (that is, the receiving end). The right side (i.e., the higher layer of the network) obtains the reconstruction image y through a series of deconvolutions according to this low-dimensional vector, and this process is equivalent to a decoder. It can be seen that both the encoder f and the decoder g can use convolutional neural networks.

The encoder f and the decoder g are set according to the above described encoder-decoder network, and train the image data in the video conference, which can achieve a sufficiently good compression rate. However, the resolution of the reconstruction image may be low. After all, the low-dimensional vector only includes the deep semantic information of the image. In order to avoid the this situation, in one embodiment, on the basis of the traditional encoder-decoder network, the encoder-decoder network is further optimized using U-Net approach, that is, a part of feature vectors output by the lower layer in the network (such as the convolutional layer in FIG. 4) is also extracted and joined to the low-dimensional vector output by the middle layer, which increases the volume of data transmitted to the remote end. However, even if this part of information is increased, the volume of data that needs to be transmitted to the remote end is still far less than the traditional compression method.

Through the optimization of the network by U-Net, the compression rate of the video image and the quality of the reconstruction image at the receiving end can be dynamically adjusted according to the network condition. When the network status is in a good condition, more information will be extracted from the feature vector output by the lower layer of the network and joined to the low-dimensional vector output by the middle layer, so that the quality of the reconstruction image at the receiving end is higher. When the network status is in a less ideal condition, less amount of information is extracted from the feature vector output by the lower layer of the network and joined to the low-dimensional vector output by the middle layer, or no information is extracted from the feature vector output from the lower layer of the network and joined, so that the image compression rate at the video image sending end can be higher, facilitating the real-time transmission of the video image.

Step S404, the second video communication end displays the reconstruction image of the video image.

According to an embodiment of the present application, in conjunction with FIG. 4 and the above-mentioned embodiments, the encoder f may include a series of convolution operations, and the decoder g may include a series of deconvolution operations.

In an embodiment, the encoder f and the decoder g that satisfy the requirements can be trained according to the following optimization objectives:

$$f, g = \arg_{f,g} \min \|I - g(f(D))\|^2$$

where $g(f(I))$ represents the reconstruction image obtained by decoding and restoring the semantic information using the decoder g, and the semantic information is obtained after the video image I is processed by using the encoder f, $\arg_{f,g} \min \|I - g(f(D))\|^2$ represents the encoder f and the decoder g when the residual between the video image I and the reconstruction image is at the minimum.

It should be understood that, in addition to the encoder-decoder network described above, other generation models can also be used to construct the encoder and the decoder that satisfy the conditions.

For video images in a video conference scenarios, the most relevant image information is commonly the details of expressions, mouth shapes of people etc. In some embodiments, using a human face as an example of the preset object, the first video communication end extracts semantic information of a human face in the video image, and the second video communication end performs image reconstruction based on the semantic information of the human face by using a corresponding decoder, so as to restore the facial details of people in the video image.

In order to acquire more video image details in the video conference, the human body can also be used as the preset object. The first video communication end extracts semantic information of the human body from the video image. The semantic information of the human body includes information about the person itself, such as facial expression information and body movement information. The second video communication end performs image reconstruction based on the semantic information of the human body by using a corresponding decoder, so as to restore the overall details of people in the video image.

Based on the above-mentioned embodiments, it is possible to ensure the real-time performance of image transmission in the video conference and restoration of image details by the receiving end, but due to the small data volume of the transmitted semantic information, it may be difficult to ensure the high resolution of the receiving end. To improve the above situation, in one embodiment, the first video communication end transmits the first reference image to the second video communication end by using a preset image transmission mode at intervals of N frames (N is greater than 1, and the value of N can be adjusted according to the actual situation). The data volume of the first reference image transmitted in the preset image transmission mode is greater than that of the semantic information. Thereinto, the first reference image is a video image captured by the first video communication end. The first reference image is used to enable the second video communication end to reconstruct the reconstruction image of the video image according to the semantic information of the video image and the first reference image.

For example, the first video communication end transmits a complete frame of video image to the second video communication end at intervals of 100 frames. In the next 99 frames of video images, when the second video communication end receives the low-dimensional semantic information of the video image, the information of this complete frame of video image can be combined to reconstruct an image together, so as to obtain a reconstruction image with higher resolution.

Hereinafter, the semantic information of the human face and the semantic information of the human body are taken as examples for description, respectively. Sequentially, with reference to FIG. 3, the above-mentioned video image transmission between the first video communication end and the second video communication end may further include the following steps:

step S300, the first video communication end sends a reference image (i.e., the first reference image in this embodiment) to the second video communication end by using the preset image transmission mode according to a preset interval of frames.

Thereinto, the reference image is also a video image captured by the first video communication end. The first video communication end can use the block-based image compression method to obtain the image encoding information of the reference image, that is, in addition to the image transmission based on semantic information, other image transmission modes may be used between the first video communication end and the second video communication end, in which other image transmission modes are executed at intervals, and the compression rate of the image is lower, and the volume of transmitted data is larger.

Step S401, the second video communication end receives a reference image.

In a video conference, the first video communication end sends a reference image to the second video communication end at intervals of frames. After the second video communication end obtains the reference image, in the video conference, the changes in the pixels of the adjacent frames of video image are generally smaller, for example, only the pixels corresponding to the expressions or the body of people may have changed while other environment information of the conference room may stay unchanged. Therefore, the semantic information received by the second video communication end may be the changed pixel information, so that the second video communication end can restore the video image to a high degree based on a small amount of semantic information and a reference image with a larger data volume, thereby improving the resolution of the reconstruction image of the second video communication end. Since the reference images are sent at intervals, the transmission bandwidth and real-time performance are less impacted.

In some embodiments, if the semantic information received in real time by the second video communication end is the semantic information of the preset object in the video image, the reconstructed sub-image of the preset object can be reconstructed, and the reconstructed sub-image of the preset object is fused with the reconstruction image of the reference image, thereby obtaining the reconstruction image of the video image of the first video communication end.

In some other embodiments, the video image transmission between the first video communication end and the second video communication end may further include the following steps:

step S301, the first video communication end performs pre-processing on the video image.

The pre-processing of the video image by the first video communication end may include recognizing the preset object in the video image to obtain the sub-image of the preset object in the video image, and then inputting the sub-image of the preset object into the trained encoder, and acquiring the output of the encoder to obtain the semantic information of the preset object in the video image. The encoder is used to recognize and output the semantic information of the preset object in the input image. Using the human face as an example of the preset object, the first video communication end recognizes a human face area from the video image to obtain a human face sub-image corresponding to the video image, and then inputs the human face sub-image into the trained encoder to acquire the output of the encoder, thereby obtaining the semantic information of the human face in the video image.

Step S403, the second video communication end receives the semantic information of the preset object, and after the reconstructed sub-image of the preset object is obtained based on the received semantic information of the preset object, post-processing on the reconstructed human face image or human body image may be performed. The post-processing includes: fusing the reconstructed sub-image of the preset object with the reference image to obtain the reconstruction image of the video image.

Using the human face serving as an example of the preset object, after obtaining the reconstruction image of the human face based on the semantic information of the human face, the second video communication end may perform post-processing on the reconstruction image of the human face. The post-processing performed on the reconstruction image of the human face by the second video communication end may include: superimposing the reconstruction image of the human face on the reconstruction image of the reference image, thereby obtaining the reconstruction image of the video image of the first video communication end.

In one embodiment, according to an embodiment of the present application, the first video communication end also needs to acquire position information of the preset object in the video image, and send the position information to the second video communication end. The position information is used to enable the second video communication end to superimpose the reconstructed sub-image of the preset object and the reference image according to the position information to obtain the reconstruction image of the video image.

In one embodiment, using the human face serving as an example of the preset object, the first video communication end may acquire the position information of the face area in the video image, send the position information to the second video communication end. After the second video communication end receives the position information of the human face sent by the first video communication end, the reconstruction image of the human face can be superimposed on the reconstruction image of the reference image according to the position information of the human face to obtain the reconstruction image of the video image of the first video communication end.

In one embodiment, in order to improve the quality of the reconstruction image of the video image, according to an embodiment of the present application, the above-mentioned video image transmission method may further include: before the reconstructed sub-image of the preset object is fused with the reference image according to the position information, the second video communication end may further perform edge feathering processing on the reconstructed sub-image of the preset object, and then superimpose the reconstructed sub-image of the preset object after the edge feathering processing on the reconstruction image of the reference image, thereby obtaining a reconstruction image of the video image of the first video communication end.

In one embodiment, taking the human face serving as the preset object as an example, before the image superimposition, the second video communication end first performs edge feathering processing on the reconstruction image of the human face, and then superimposes the reconstruction image of the human face after the edge feathering processing on the reconstruction image of the reference image, thereby obtaining the reconstruction image of the video image of the first video communication end. Through this embodiment, a better superposition and fusing effect can be obtained, and the image quality of the reconstruction image displayed by the second video communication end can be improved.

In some other embodiments, in order to acquire the overall details of the video conference, the semantic information extracted from the video image by the first video communication end may also be global semantic information of the image, which can be implemented through a corresponding encoder. The second video communication end performs image reconstruction based on the global semantic information, so as to restore the global detail information in the video image. When image transmission and reconstruction are performed based on the global semantic information, the first video communication end may not need to perform the above-mentioned pre-processing of the video image, and the second video communication end may not need to perform the post-processing of the reconstruction image correspondingly.

It should be understood that the encoder and decoder can be pre-trained based on human face semantics, human body semantics, or image global semantics according to actual scene needs. For example, the face image is used as training data to train the encoder and decoder that meet the requirements, or the human body image is used as the training data to train the encoder and decoder that meet the requirements, or the entire video image is used as the training data to train the encoder and decoder that meet the requirements.

In other embodiments, the first video communication end may further send other types of reference images (i.e., second reference image) to the second video communication end by using a preset image transmission mode. The data volume of the second reference image transmitted by using the preset image transmission mode is greater than that of the semantic information. The second reference image herein may be at least one of an image of the preset object and an environment image of the first video communication end. By transmitting the second reference image, the second video communication end may combine the semantic information and the second reference image to reconstruct the reconstruction image of the video image.

For example, the first video communication end presets a high-definition photo of people participating in the video conference scene and/or a high-definition photo of the conference room as the second reference image, and transmits the complete second reference image to the second video communication end by using the preset image transmission mode. The second video communication end receives and saves the second reference image. After receiving the semantic information of each frame of video image, the image can be reconstructed by combining the detailed information of the second reference image. Therefore, even in the case of less semantic information, the second video communication end can also reconstruct a high-resolution reconstruction image based on the second reference image.

In one embodiment, if the video image is independently encoded and decoded frame by frame, there may be inconsistencies between frames, which represents that the video content displayed at the receiving end may jump to different degrees Aiming at the above-mentioned situation, in an embodiment, the video image transmission in the video conference scene actually may include multiple network branches. The input of the encoder may not necessarily be the current frame of the video image, but can also include M frames of video image before the current frame, so that the encoded low-dimensional vector incudes not only the semantic information of the current frame, but also the semantic information of several earlier frames. Correspondingly, the decoder at the receiving end can also combine the semantic information of the current frame with the semantic information of several previous frames to reconstruct a video image that is consistent between frames. Through this embodiment, it is possible to avoid the jump of the video content at the receiving end.

Compared with the video image transmission solution of the traditional scheme, according to the above-mentioned embodiments, in the video conference, each video communication end obtains high-resolution reconstruction images, and since for most video images, the volume of semantic information data needs to be transmitted is very small, even in a worse network environment, the transmission can be completed quickly to ensure real-time performance. When image reconstruction is performed based on the semantic information and the reference image, it is possible to retain important information (particularly human face details, body movement details, etc.) in the video image, therefore resulting in a good video conference experience.

Figure 5:
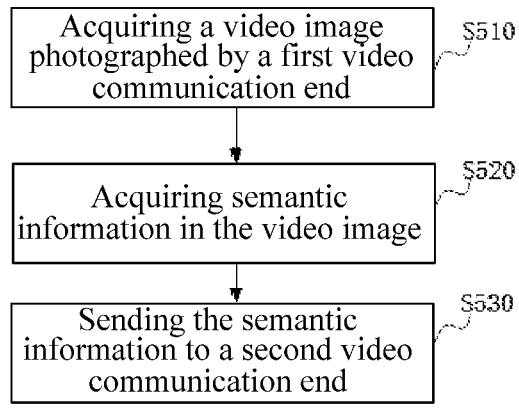
FIG. 5 is a schematic flowchart of a video image transmission method based on an image sending end according to an embodiment.

Based on the same idea of the above-mentioned video image transmission method, the present disclosure may further provide an embodiment of a video image transmission method. In this embodiment, the first video communication end is the sending end of the video image. As shown in FIG. 5, from the perspective of the first video communication end, the video image transmission method may include the following steps of:

S510, acquiring a video image captured by a first video communication end,

S520, acquiring semantic information in the video image, and

S530, sending the semantic information to a second video communication end. The semantic information is used to, after receiving the semantic information, enable the second video communication end to display the reconstruction image of the video image through the display screen of the second video communication end. The reconstruction image is an image reconstructed by the second video communication end based on the semantic information.

In an embodiment, the manner of acquiring the semantic information in the video image by the first video communication end serving as the sending end may include extracting the semantic information of the video image by using a trained encoder. The encoder is used to recognize image semantic information. The input of the encoder is an image, and the output of the encoder is a low-dimensional vector corresponding to the input image, that is, the semantic information of the input image. For example, since the semantic information of the video image may be the semantic information of the preset object or the global semantic information of the video image. Therefore, the manners of extracting the semantic information of the video image may include:

1, recognizing the preset object in the video image to obtain a sub-image of the preset object, inputting the sub-image of the preset object into a trained encoder, and acquiring the output of the encoder to obtain the semantic information of the preset object in the video image, 2, inputting the video image into a trained encoder, and acquiring the output of the encoder to obtain global semantic information in the video image.

Thereinto, the preset object can be set based on the actual situation. For example, when the information that needs attention is the facial information of people in the video communication, the human face is used as the preset object. When the information that needs attention is the body movement information of people in the video communication, the human body is used as the preset object. When the information that needs attention is the overall scene information in the video communication, the global semantic information of the video image is extracted. Therefore, different requirements of video communication can be satisfied.

According to an embodiment of the present application, the step of extracting the semantic information of the preset object in the video image by the first video communication end may include: recognizing the human face area in the video image to obtain a human face sub-image, inputting the human face sub-image into a trained encoder, and acquiring the output of the encoder to obtain the semantic information of the human face in the video image; or, recognizing the human body area in the video image to obtain a human body sub-image, inputting the human body sub-image into the trained encoder, and acquiring the output of the encoder to obtain the semantic information of the human body in the video image. Therefore, the extraction efficiency and accuracy of the semantic information of the preset object in the video image can be improved.

Thereinto, the step of extracting the global semantic information in the video image by the first video communication end may not need to recognize the preset object in the video image, which simplifies the image transmission process and obtains more comprehensive semantic information. Therefore, the receiving end can obtain a reconstruction image with higher fidelity.

In one embodiment, when the semantic information is the semantic information of the preset object such as the semantic information of the human face or the semantic information of the human body, the first video communication end may further send a first reference image to the second video communication end by using a preset image transmission mode at intervals of N frames. The data volume of the first reference image transmitted in the preset image transmission mode is greater than that of the semantic information, wherein N is greater than 1. The first reference image belongs to video image captured by the first video communication end. By transmitting the first reference image, the second video communication end is enabled to reconstruct a reconstruction image of the video image according to the semantic information and the first reference image.

By sending the first reference image to the second video communication end, after receiving the semantic information of the preset object, the second video communication end obtains the reconstructed sub-image of the preset object based on the semantic information, and then superimposes the reconstructed sub-image of the preset object on the reconstruction image of the first reference image, thereby obtaining the reconstruction image of the video image.

In an embodiment, when the semantic information is the semantic information of the preset object in the video image, in order to enable the second video communication end to obtain a reconstruction image with a better quality, the first video communication end may further need to send the above-mentioned position information of the preset object in the video image to the second video communication end. By sending the position information, the second video communication end is enabled to fuse the reconstructed sub-image of the preset object with the first reference image according to the position information, thereby obtaining a more accurate reconstruction image of the video image.

By sending the second position information to the second video communication end, the second video communication end is enabled to superimpose the reconstructed reconstruction image of the human body on the reconstruction image of the reference image according to the second position information, to obtain a more accurate reconstruction image of the video image.

In the above video image transmission method, for most video images, the sending end only needs to extract important semantic information in the video image for transmission. Based on the reference image, the requirements of the resolution and fidelity of the reconstruction image can be taken into account, and the real-time performance of video image transmission can be ensued.

Figure 6:
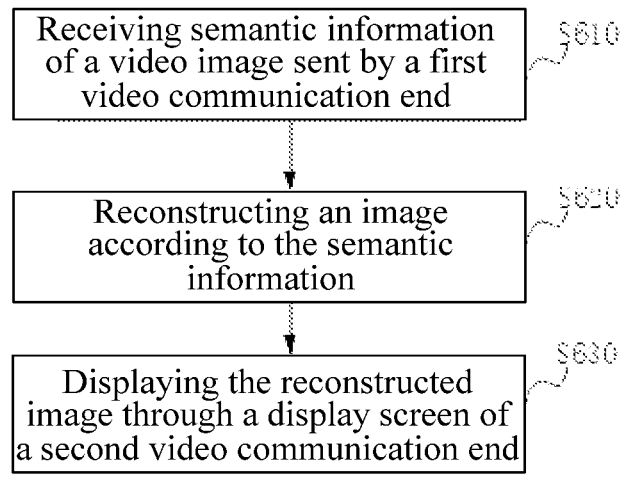
FIG. 6 is a schematic flowchart of a video image transmission method based on an image receiving end according to an embodiment.

Similar to the above-mentioned video image transmission method, the present application may further provide an embodiment of a video image transmission method. In this embodiment, the second video image end is the receiving end of the video image. As shown in FIG. 6, from the perspective of the second video image end, the video image transmission method includes the following steps of:

S610, receiving semantic information of a video image sent by a first video communication end, wherein the video image is a video image captured by the first video communication end, S620, reconstructing an image according to the semantic information to obtain a reconstruction image of the video image, and S630, displaying the reconstruction image through a display screen of a second video communication end.

In some embodiments, the semantic information of the video image may include any one of the following: semantic information of a preset object in the video image, and global semantic information in the video image. Thereinto, the preset object includes but is not limited to a human face or a human body, and can also be set according to an actual scene.

In an embodiment, when the transmitted semantic information is the semantic information of the preset object in the video image, in order to better perform the image reconstruction at the receiving end, the first video communication end further sends a first reference image to the second video communication end by using a preset image transmission mode at intervals of N frames. The first reference image belongs to a video image captured by the first video communication end, and the data volume of the first reference image transmitted in the preset image transmission mode is greater than that of the semantic information. N is greater than 1. The second video communication end performs image reconstruction according to the first reference image and the currently received semantic information of the preset object.

Correspondingly, the second video communication end may further receive the first reference image from the first video communication end by using the preset image transmission mode at intervals of N frames. N is greater than 1.

In the following, the semantic information of the human face and the semantic information of the human body are respectively described as examples.

When the video image is transmitted and reconstructed based on the semantic information of the human face, the second video communication end may further need to receive in advance the image encoding information of the first reference image from the first video communication end. The reference image is the video image captured by the first video communication end. And the data volume of the image encoding information of the first reference image is greater than that of the semantic information of a human face/the semantic information of a human body in the video image of the above-mentioned embodiments.

The second video communication end may obtain the first reference image based on the image encoding information. When receiving the semantic information of the human face/the semantic information of the human body of other video images, the reconstructed sub-image of the human face/the reconstructed sub-image of the human body can be reconstructed based on the semantic information of the human face/the semantic information of the human body. The reconstructed sub-image of the human face/the reconstructed sub-image of the human body is fused with the first reference image to obtain reconstruction images of other video images. Thereinto, the implementation process of the reconstructed sub-image of the human face/the reconstructed sub-image of the human body reconstructed based on the semantic information of the human face/the semantic information of the human body can be as follows:

after receiving the semantic information of the human face/the semantic information of the human body sent by the first video communication end, the second video communication end may obtain the semantic information of the human face/the semantic information of the human body into the trained decoder, and acquire the output of the decoder to obtain the reconstructed sub-image of the human face/the reconstructed sub-image of the human body. Thereinto, the input of the decoder is image semantic information, and the output of the decoder is an image reconstructed based on the input semantic information. As described in the above-mentioned embodiment, the decoder may be a convolutional neural network.

In an embodiment, when performing image reconstruction based on the semantic information of the preset object, in order to obtain a reconstruction image with a higher quality, the second video communication end may further receive the position information from the first video communication end. The position information can be the position information of the preset object in the video image. Then, the second video communication end may superimpose the reconstructed sub-image of the preset object on the first reference image according to the position information to obtain the reconstruction image of the video image.

In an embodiment, using the transmission and reconstruction of the video image based on semantic information of the human face as an example, the second video communication end may receive the first position information from the first video communication end, and the first position information can be the position information of a human face area in the video image of the video communication end. Correspondingly, the second video communication end may superimpose the reconstruction image of the human face on the first reference image according to the first position information to obtain the reconstruction image of the video image.

Using the transmission and reconstruction of the video image based on the semantic information of a human body as an example, the second video communication end may receive the second position information from the first video communication end, and the second position information is the position information of a human body area in the video image. Correspondingly, the second video communication end may superimpose the reconstruction image of the human body on the first reference image according to the second position information to obtain the reconstruction image of the video image.

In other embodiments, the second video communication end may further acquire the second reference image received by using the preset image transmission mode. The second reference image is at least one of an image of the preset object and an environment image of the first video communication end. The data volume of the second reference image received by using the preset image transmission mode is greater than that of the semantic information. The second video communication end reconstructs the image according to the semantic information and the second reference image to obtain the reconstruction image of the video image. The implementation process can refer to the description of the above-mentioned embodiments.

By using the above-mentioned video image transmission method, for the video image receiving end, image reconstruction is performed based on relevant semantic information in an image and a more complete reference image, while satisfying the requirements of real-time performance, resolution and fidelity in the image transmission.

It should be understood that, for each above-mentioned method embodiment, although each step in the flowchart is displayed sequentially as indicated by the arrows, these steps are not necessarily performed sequentially in the order indicated by the arrows. Unless there is a clear description in the present application, there is no strict limit to the order of executing these steps, and these steps can be executed in other orders. Moreover, at least a part of the steps in the flowchart of the method embodiment may include multiple sub-steps or multiple stages. These sub-steps or stages are not necessarily executed and completed at the same time, but may be executed at different times. The execution order of these sub-steps or stages is not necessarily carried out sequentially, but may be executed in turn or alternately with at least a part of other steps, or sub-steps or stages of the other steps.

Based on the same idea as the video image transmission method in the above-mentioned embodiment, the present application further provides an embodiment of a video image transmission device.

Figure 7:
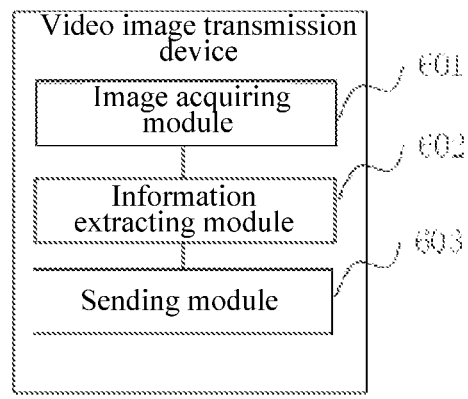
FIG. 7 is a schematic structure diagram of a video image transmission device according to an embodiment.

As shown in FIG. 7, in an embodiment, the video image transmission device includes:
an image acquiring module 601, configured to acquire a video image captured by a first video communication end,
an information extracting module 602, configured to extract semantic information of the video image, and
a sending module 603, configured to send the semantic information to a second video communication end. The semantic information is used to reconstruct a reconstruction image of the video image at the second video communication end.

According to an embodiment of the present application, the information extracting module 601 is configured to extract the semantic information of the video image by a trained encoder, and the encoder is configured to recognize image semantic information.

According to an embodiment of the present application, the input of the encoder is an image, and the output of the decoder is a low-dimensional vector corresponding to the input image, serving as the semantic information of the input image. For example, the encoder may be a convolutional neural network.

In one of the embodiments, the semantic information in the video image includes any one of the following: semantic information of a preset object in the video image, and global semantic information of the video image.

If the extracted object semantic information is the semantic information of the preset object, correspondingly, the information extracting module 602 may include: an object information extracting sub-module, configured to recognize the preset object in the video image to obtain a sub-image of the preset object, input the sub-image of the preset object into the trained encoder, and acquire the output of the encoder to obtain semantic information of the preset object in the video image.

Thereinto, the preset object may be a human face or a human body. If the preset object is a human face, the above-mentioned object information extracting sub-module may include: a human face information extracting sub-module, configured to recognize a human face area in the video image to obtain a human face sub-image, input the human face sub-image into the trained encoder, and acquire the output of the encoder to obtain a semantic information of the human face in the video image. If the preset object is a human body, the above-mentioned object information extracting sub-module may include: a human body information extracting sub-module, configured to recognize a human body area in the video image to obtain a human body sub-image, input the human body sub-image into the trained encoder, and acquire the output of the encoder to obtain a semantic information of the human body in the video image.

If the extracted semantic information is global semantic information of a video image, correspondingly, the information extracting module 602 may include: a global information extracting sub-module, configured to input the video image to the trained encoder, and acquire the output of the encoder to obtain the global semantic information in the video image.

According to an embodiment of the present application, the above-mentioned video image transmission device may further include:
  a first reference image sending module, configured to send a first reference image to the second video communication end by using a preset image transmission mode at intervals of N frames. The data volume of the first reference image transmitted in the preset image transmission mode is greater than that of the semantic information. N is greater than 1.

The first reference image belongs to a video image captured by the first video communication end. The first reference image is used to enable the second video communication end to reconstruct a reconstruction image of the video image according to the semantic information and the first reference image.

If the semantic information is the semantic information of the preset object, the first reference image may be used to enable the second video communication end to obtain the reconstructed sub-image of the preset object according to the received semantic information, and fuse the reconstructed sub-image with the first reference image to obtain the reconstruction image of the video image.

If the sent semantic information is global semantic information, the first reference image may be used to enable the second video communication end to obtain an initial reconstruction image according to the received semantic information, and fuse the initial reconstruction image with the first reference image to obtain the reconstruction image of the video image.

In other embodiments, if the semantic information is the semantic information of the preset object, the above-mentioned video image transmission device further may include:
  an object position acquiring module, configured to acquire position information of the preset object in the video image, and
  a position information sending module, configured to send the position information to the second video communication end. The position information is used to enable the second video communication end to fuse the reconstructed sub-image of the preset object with the first reference image according to the position information to obtain the reconstruction image of the video image.

According to an embodiment of the present application, the above-mentioned video image transmission device may further include:
  a second reference image sending module, configured to send a second reference image to the second video communication end by using a preset image transmission mode. The data volume of the second reference image transmitted in the preset image transmission mode is greater than that of the semantic information.

The second reference image is at least one of an image of the preset object and an environment image of the first video communication end. The second reference image is used to enable the second video communication end to reconstruct a reconstruction image of the video image according to the semantic information and the second reference image.

Based on the video image transmission device of the above-mentioned embodiment, in video communication, when the sending end needs to transmit a video image, the semantic information of the video image is acquired, and the semantic information is sent to the receiving end. After the receiving end receives the semantic information, the video image of the sending end can be reconstructed according to the semantic information, thereby obtaining a reconstruction image, and the reconstruction image is displayed on the display screen of the receiving end. On the one hand, in video communication, the transmission of one video image may only transmit a very small data volume, at very low network bandwidth requirements and can meet the requirements of real-time transmission. On the other hand, by compressing and restoring video images based on the semantic information, the receiving end of the video image can reconstruct an image with higher quality, and take into account the requirements for images with high resolution and high fidelity in video communication.

Figure 8:
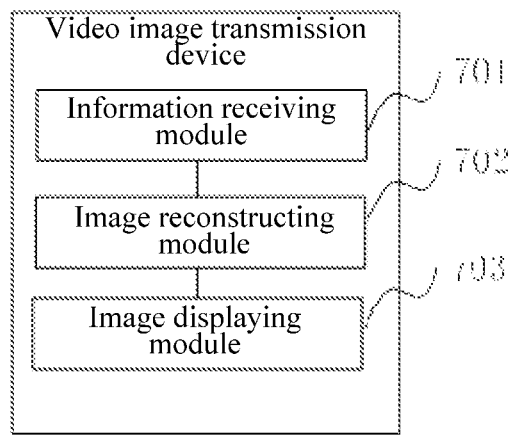
FIG. 8 is a schematic structure diagram of a video image transmission device according to another embodiment.

According to another embodiment of the present application, as shown in FIG. 8, a video image transmission device includes: an information receiving module 701, configured to receive semantic information of a video image, wherein the video image is the video image captured by a first video communication end;
  an image reconstructing module 702, configured to reconstruct an image according to the semantic information to obtain a reconstruction image of the video image; and
  an image displaying module 703, configured to display the reconstruction image on a display screen of a second video communication end.

According to an embodiment of the present application, the image reconstructing module 702 is configured to reconstruct an image according to the semantic information and a pre-trained decoder to obtain the reconstruction image of the video image.

According to an embodiment of the present application, the semantic information of the video image may include any one of the following: semantic information of a preset object in the video image, and global semantic information of the video image.

Thereinto, the input of the encoder is an image semantic information, and the output of the encoder is an image reconstructed based on the input semantic information. In some scenes, the encoder may be a convolutional neural network.

According to an embodiment of the present application, the semantic information of the video image may include any one of the following: semantic information of a preset object in the video image, and global semantic information of the video image. For example, the preset object is a human face, a human body etc.

According to an embodiment of the present application, the image reconstructing module 702 may include:
  a first reference image acquiring sub-module, configured to acquire the first reference image received through a preset image transmission mode in the latest time, where the first reference image is a video image captured and sent by the first video communication end, the data volume of the first reference image received by using the preset image transmission mode is greater than that of the semantic information; and a first image reconstructing sub-module, configured to reconstruct an image according to the semantic information and the first reference image to obtain the reconstruction image of the video image.

According to an embodiment of the present application, the above-mentioned video image transmission device further comprises: a first reference image receiving sub-module, configured to receive the first reference image from the first video communication end by using the preset image transmission mode at intervals of N frames, wherein N is greater than 1.

In an embodiment, if the received semantic information is the semantic information of the preset object, the above-mentioned image reconstructing module 702 may include: a first reconstructing sub-module, configured to input the semantic information into the trained decoder, acquire the output of the decoder to obtain a reconstructed sub-image of the preset object, and fuse the reconstructed sub-image of the preset object with the first reference image to obtain the reconstruction image of the video image.

In an embodiment, the above-mentioned video image transmission device may further include: a position information receiving module, configured to receive position information sent by the first video communication end, where the position information is the position information of the preset object in the video image, and the above-mentioned first image reconstructing sub-module is configured to fuse the reconstructed sub-image of the preset object with the first reference image according to the position information to obtain the reconstruction image of the video image.

In an embodiment, if the received semantic information is the image global semantic information, the above-mentioned image reconstructing module 702 may include: a second image reconstructing sub-module, configured to input the semantic information into a trained decoder, acquire the output of the decoder to obtain an initial reconstruction image, and fuse the initial reconstruction image with the first reference image to obtain the reconstruction image of the video image.

According to an embodiment of the present application, the image reconstructing module 702 may include:

a second reference image acquiring sub-module, configured to acquire a second reference image received through the preset image transmission mode, where the second reference image is at least one of an image of the preset object and an environment image of the first video communication end, the data volume of the second reference image received by using the preset image transmission mode is greater than that of the semantic information; and a second image reconstructing sub-module, configured to reconstruct an image according to the semantic information and the second reference image to obtain a reconstruction image of the video image.

Based on the video image transmission device of the above-mentioned embodiment, in video communication, when needing to transmit a video image, the sending end may acquire the semantic information of the video image, and send the semantic information to the receiving end. After receiving the semantic information, the receiving end may reconstruct the video image of the sending end according to the semantic information, thereby obtaining a reconstruction image, and the reconstruction image is displayed through the display screen of the receiving end. On the one hand, in video communication, the transmission of one video image may only transmit a very small data volume, at very low network bandwidth requirements and can meet the requirements of real-time transmission. On the other hand, by compressing and restoring video images based on the semantic information, the receiving end of the video image can reconstruct an image with higher quality, while satisfying the requirements for images with high resolution and high fidelity in video communication.

According to an embodiment of the present application, as shown in FIG. 1, a video image transmission system may include a first video communication end and a second video communication end. The first video communication end and the second video communication end are in a video communication connection. The first video communication end is configured to acquire a captured video image, acquire semantic information of the video image, and send the semantic information to the second video communication end. The second video communication end is configured to receive the semantic information, reconstruct an image according to the semantic information to obtain a reconstruction image of the video image, and display the reconstruction image through a display screen of the second video communication end.

Regarding the implementations of the video image transmission device and system embodiments, reference can be made to the above-mentioned limitation of the video image transmission method, which will not be repeated herein. Each module in the above-mentioned video image transmission device can be implemented in whole or in part by software, hardware, and a combination thereof. The above-mentioned modules can be embedded or independent of the processor in the interactive intelligent tablet in the form of hardware, or can be stored in the memory of the interactive intelligent tablet in the form of software, so that the processor can call and execute the operations corresponding to each of the above-mentioned modules.

In addition, in the implementation approach of the video image transmission device of the above-mentioned examples, the logical division of each program module is only an example. In actual applications, due to the requirements, for example, the configuration requirements of the corresponding hardware or the convenience of the realization of the software, the allocation of the above-mentioned functions can be completed by different program modules according to needs. That is, the internal structure of the video image transmission device is divided into different program modules so as to the whole or a part of the functions described above.

Figure 9:
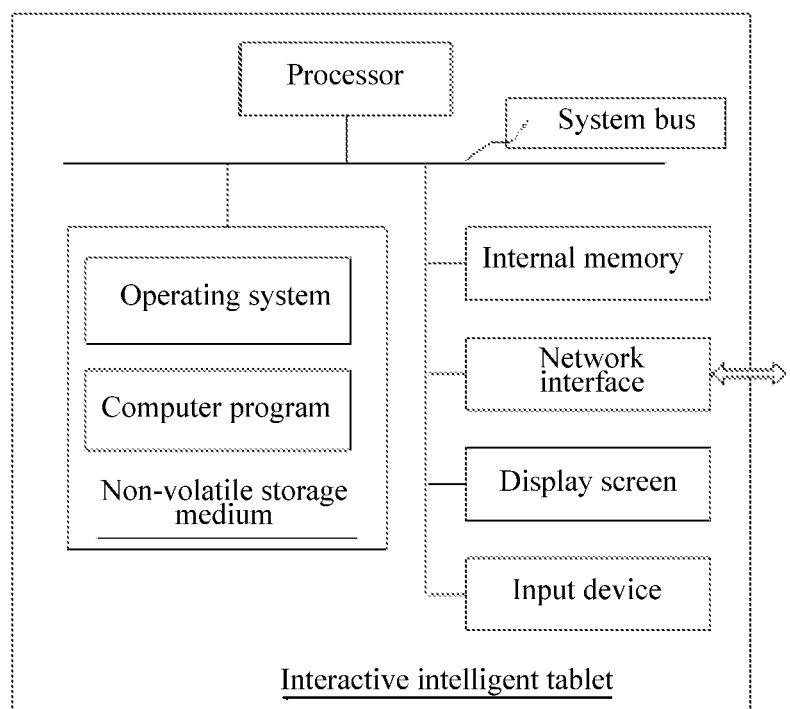
FIG. 9 is an internal structure diagram of an interactive intelligent tablet in an embodiment.

In an embodiment, an interactive intelligent tablet is provided, of which the internal structure diagram may be as shown in FIG. 9. The interactive intelligent tablet includes a processor, a memory, a network interface, a display screen, a photography device, and an input device that connected by using a system bus. Thereinto, the processor is configured to provide computing and control capabilities. The memory includes a non-volatile storage medium and an internal memory. An operating system and a computer program are stored in the non-volatile storage medium. The internal memory provides a running environment for the operating system and the computer program in the non-volatile storage medium. The network interface is configured to connect and communicate with external terminals through a network. When being executed by the processor, the computer program implements a video image transmission method. The display screen can be a liquid crystal display or an electronic ink display screen. The photography device can capture the video image of the environment or people in front of the interactive intelligent tablet. The input device can be a touch layer covered on the display screen, or can be a button, trackball or touch pad arranged on the shell of the interactive intelligent tablet, or can also be an external keyboard, touchpad, or mouse.

Those skilled in the art can understand that the structure shown in FIG. 9 is only a block diagram of a part of the structure related to the solution of the present application, and does not constitute a limitation on the interactive intelligent tablet to which the solution of the present application is applied. The concrete interactive intelligence tablet may include more or fewer parts than those shown in the figures, or combine certain parts, or have a different arrangement of parts.

According to an embodiment of the present application, an interactive intelligent tablet is provided. The interactive intelligent tablet includes a photography device, a display screen, a memory, and a processor. A computer program is stored in the memory. The interactive intelligent tablet captures video images through the photography device. When executing the program, the processor is configured to extract semantic information of the video image captured by the photography device, send the semantic information to other interactive intelligent tablets. When executing the program, the processor is further configured to receive semantic information of the video image sent by the other interactive intelligent tablet, reconstruct an image according to the semantic information to obtain a reconstruction image of the video image sent by the other interactive intelligent tablet, and display the reconstruction image through the display screen.

In other embodiments, when executing the program, the processor is further configured to execute corresponding steps in other embodiments of the above-mentioned video image transmission method.

According to an embodiment of the present application, a computer-readable storage medium is provided. A computer program is stored on the computer-readable storage medium, and when being executed by a processor, the computer program implements the following steps of: acquiring a video image captured by a first video communication end, extracting semantic information of the video image, and sending the semantic information to a second video communication end. The semantic information is used to reconstruct a reconstruction image of the video image at the second video communication end.

In other embodiments, when being executed by the processor, the above-mentioned computer program is further used to execute the corresponding steps executed at the video image sending end in other embodiments of the above-mentioned video image transmission method.

According to another embodiment of the present application, another computer-readable storage medium is provided. A computer program is stored on the another computer-readable storage medium, and when being executed by a processor, the computer program implements the following steps of: receiving semantic information of a video image, wherein the video image is a video image captured by a first video communication end; reconstructing an image according to the semantic information to obtain a reconstruction image of the video image; and displaying the reconstruction image through the display screen of the second video communication end.

In other embodiments, when being executed by the processor, the above-mentioned computer program is further used to execute the corresponding steps executed at the video image receiving end in another embodiment of the above-mentioned video image transmission method.

Those skilled in the art can understand that all or a part of the flow in the method of the above-mentioned embodiments can be completed by instructing relevant hardware through a computer program. The computer program can be stored in a non-volatile computer readable storage medium. When being executed, the computer program may include the flow of the above-mentioned method embodiments. Thereinto, any reference to memory, storage, database or other media used in each embodiment provided in the present application may include non-volatile and/or volatile memory. Non-volatile memory may include Read Only Memory (ROM), Programmable ROM (PROM), Electrically Programmable ROM (EPROM), Electrically Erasable Programmable ROM (EEPROM), or flash memory. Volatile memory may include Random Access Memory (RAM) or external cache memory. As an illustration but not a limitation, RAM is available in many forms, such as Static RAM (SRAM), Dynamic RAM (DRAM), Synchronous DRAM (SDRAM), Double Data Rate SDRAM (DDRSDRAM), Enhanced SDRAM (ESDRAM), Synchlink DRAM (SLDRAM), Rambus Direct RAM (RDRAM), Direct Rambus Dynamic RAM (DRDRAM), and Rambus Dynamic RAM (RDRAM), etc.

Each technical feature of the above embodiments can be combined arbitrarily. In order to make the description concise, the present application does not describe all possible combinations of the technical features in the above-mentioned embodiments. However, as long as there is no contradiction in the combination of these technical features, they should be considered as the scope described in this description. The description of each of the above-mentioned embodiments has its own emphasis. For parts that are not described in detail in an embodiment, reference may be made to related descriptions of other embodiments.

The terms "including" and "comprising" in the embodiments and any variations thereof are intended to cover non-exclusive inclusions. For example, a process, a method, a system, a product, or a device including a series of steps or (module) units is not limited to the listed steps or units, but also includes steps or units that are not listed, or also includes other steps or units inherent in these processes, methods, products or devices.

The "multiple" mentioned in the embodiment means two or more. "And/or" describes the association relationship of the associated objects, indicating that there can be three types of relationships, for example, A and/or B can mean three situations: A alone exists, A and B exist at the same time, and B exists alone. The character "/" generally indicates that the previous and next associated objects are in an "or" relationship.

The "first\second" mentioned in the embodiment only distinguishes similar objects, and does not represent a specific order for the objects. Understandably, "first\second" can be interchanged with specific order or sequence when permitted. It should be understood that the objects distinguished by "first\second" can be interchanged under appropriate circumstances, so that the embodiments described herein can be implemented in an order other than those illustrated or described herein.

What is claimed is:

1. A video image transmission method, comprising:
acquiring a video image captured by a first video communication end;

determining an encoding mode, wherein the encoding mode comprises one of a preset object mode;

recognizing the preset object in the video image to obtain a sub-image of the preset object;

providing the sub-image of the preset object to a trained neural network, wherein the trained neural network comprises an encoder comprising a series of one or more convolution layers and a middle layer to sequentially process the sub-image, and wherein the one or more convolution layers comprise a lower convolution layer whose output is fed to the middle layer;

executing the trained neural network to output a part of feature vectors extracted from the lower convolution layer and a low-dimensional vector from the middle layer, the low-dimensional vector representing semantic information of the preset object in the video image; and sending, through a communication network, the part of the feature vectors extracted from the lower convolution layer and the low-dimensional vector representing the semantic information to a second video communication end, wherein the semantic information is used by a decoder to reconstruct a reconstruction image of the video image at the second video communication end.

2. The method according to claim 1, wherein the trained neural network is configured to recognize image semantic information, and wherein an amount of information of the part of the feature vectors extracted from the lower convolution layer is dynamically adjusted based on a condition of the communication network.

3. The method according to claim 2, wherein the semantic information in the video image comprises any one of the following:

the preset object in the video image, or global semantic information of the video image.

4. The method according to claim 1, wherein the preset object comprises a human face or a human body, wherein if the preset object is a human face, extracting the semantic information of the preset object in the video image comprises:

recognizing a human face area in the video image to obtain a human face sub-image;

inputting the human face sub-image into the trained neural network; and acquiring the output of the trained neural network to obtain semantic information of the human face in the video image, and wherein if the preset object is a human body, extracting the semantic information of the preset object in the video image comprises:

recognizing a human body area in the video image to obtain a human body sub-image;

inputting the human body sub-image into the trained neural network; and acquiring the output of the trained neural network to obtain semantic information of the human body in the video image.

5. The method according to claim 1, wherein the encoding mode further comprises a global semantic information mode, the method further comprising:

responsive to determining that the encoding mode is the global semantic information mode, extracting the global semantic information in the video image by:

inputting the video image into the trained neural network; and acquiring the output of the trained neural network to obtain the global semantic information in the video image.

6. The method according to claim 1, further comprising:

sending a first reference image to the second video communication end by using a preset image transmission mode at intervals of N frames, wherein data volume of the first reference image transmitted in the preset image transmission mode is greater than that of the semantic information, and N is greater than 1;

the first reference image is part of a video image captured by the first video communication end, and the first reference image is used to enable the second video communication end to reconstruct the reconstruction image of the video image according to the semantic information and the first reference image.

7. The method according to claim 6, wherein if the semantic information is the preset object, the first reference image is used to enable the second video communication end to obtain a reconstructed sub-image of the preset object according to the received semantic information, and fuse the reconstructed sub-image with the first reference image to obtain the reconstruction image of the video image.

8. The method according to claim 7, wherein if the semantic information is the preset object, the method further comprises:

acquiring position information of the preset object in the video image; and sending the position information to the second video communication end, wherein the position information is used to enable the second video communication end to fuse the reconstructed sub-image of the preset object with the first reference image according to the position information to obtain the reconstruction image of the video image.

9. The method according to claim 6, wherein if the semantic information is the global semantic information, the first reference image is used to enable the second video communication end to obtain an initial reconstruction image according to the received semantic information, and fuse the initial reconstruction image with the first reference image to obtain the reconstruction image of the video image.

10. The method according to claim 6, further comprising:

sending a second reference image to the second video communication end by using a preset image transmission mode, wherein the data volume of the second reference image transmitted in the preset image transmission mode is greater than that of the semantic information, the second reference image is at least one of an image of the preset object or an environment image of the first video communication end, and the second reference image is used to enable the second video communication end to reconstruct the reconstruction image of the video image according to the semantic information and the second reference image.

11. A video image transmission method, comprising:

receiving semantic information of a video image and a part of feature vectors, wherein the video image is a video image captured by a first video communication end, wherein a trained neural network comprising an encoder comprising a series of one or more convolution layers and a middle layer to sequentially process a sub-image of the video image, and wherein the one or more convolution layers comprise a lower convolution layer whose output is fed to the middle layer, and the part of feature vectors is extracted from the lower convolution layer and the semantic information is output from the middle layer;

determining an encoding mode, wherein the encoding mode comprises a preset object mode;

inputting the semantic information and the part of the feature vectors into a pre-trained neural network;

executing the pre-trained neural network to output a reconstructed sub-image of the preset object;

obtaining a reconstruction image of the video image; and displaying the reconstruction image on a display screen of a second video communication end.

12. The method according to claim 11, wherein reconstructing an image according to the semantic information and the part of the feature vectors to obtain the reconstruction image of the video image comprises:

acquiring a first reference image received by using a preset image transmission mode in the most recent time, wherein the first reference image is a video image captured and sent by the first video communication end, and data volume of the first reference image received by using the preset image transmission mode is greater than that of the semantic information; and reconstructing an image according to the semantic information and the first reference image to obtain the reconstruction image of the video image.

13. The method according to claim 12, further comprising:

receiving the first reference image from the first video communication end by using the preset image transmission mode at intervals of N frames, wherein N is greater than 1.

14. The method according to claim 13, further comprising: responsive to determining that the encoding mode is the preset object mode, reconstructing an image according to the semantic information, the part of the feature vectors, and the first reference image to obtain the reconstruction image of the video image by:

fusing the reconstructed sub-image of the preset object with the first reference image to obtain the reconstruction image of the video image.

15. The method according to claim 14, further comprising:

receiving position information sent by the first video communication end, wherein the position information is the position information of the preset object in the video image, wherein fusing the reconstructed sub-image of the preset object with the first reference image to obtain the reconstruction image of the video image comprises:

fusing the reconstructed sub-image of the preset object with the first reference image according to the position information to obtain the reconstruction image of the video image.

16. The method according to claim 15, wherein before fusing the reconstructed sub-image of the preset object with the first reference image according to the position information, the method further comprises:

performing edge feathering processing on the reconstructed sub-image of the preset object.

17. The method according to claim 13, wherein the encoding mode further comprises a global semantic information mode, the method further comprising:

responsive to determining that the encoding mode is the global semantic information mode, reconstructing an image according to the semantic information and the first reference image to obtain the reconstruction image of the video image by:

inputting the semantic information into the pre-trained neural network;

acquiring the output of the pre-trained neural network to obtain an initial reconstruction image; and fusing the initial reconstruction image with the first reference image to obtain the reconstruction image of the video image.

18. A video image transmission device, comprising: a processing device configured to acquire a video image captured by a first video communication end;

determine an encoding mode, wherein the encoding mode comprises a preset object mode;

recognize the preset object in the video image to obtain a sub-image of the preset object;

provide the sub-image of the preset object into a trained neural network, wherein the trained neural network comprises an encoder comprising a series of one or more convolution layers and a middle layer to sequentially process the sub-image, and wherein the one or more convolution layers comprise a lower convolution layer whose output is fed to the middle layer;

execute the trained neural network to output a part of feature vectors extracted from the lower convolution layer and a low-dimensional vector from the middle layer, the low-dimensional vector representing semantic information of the preset object in the video image; and send, through a communication network, the part of the feature vectors extracted from the lower convolution layer and the low-dimensional vector representing the semantic information to a second video communication end, wherein the semantic information is used by a decoder, to reconstruct a reconstruction image of the video image at the second video communication end.

19. The device according to claim 18, wherein the processing device is configured further to extract the semantic information of the video image by using a trained neural network, wherein the trained neural network is configured to recognize image semantic information, and wherein an amount of information of the part of the feature vectors extracted from the lower convolution layer is dynamically adjusted based on a condition of the communication network.

20. The device according to claim 19, wherein the semantic information in the video image comprises any one of the following:

the preset object in the video image, or global semantic information of the video image.

21. A video image transmission device, comprising: a processing device configured to receive semantic information of a video image and a part of feature vectors, wherein the video image is a video image captured by a first video communication end, wherein a trained neural network comprising an encoder comprising a series of one or more convolution layers and a middle layer to sequentially process a sub-image of the video image, and wherein the one or more convolution layers comprise a lower convolution layer whose output is fed to the middle layer, and the part of feature vectors is extracted from the lower convolution layer and the semantic information is output from the middle layer;

determine an encoding mode, wherein the encoding mode comprises a preset object mode;

input the semantic information and the part of the feature vectors into a pre-trained neural network;

execute the pre-trained neural network to output a reconstructed sub-image of the preset object;

obtain a reconstruction image of the video image; and display the reconstruction image through a display screen of a second video communication end.

22. The device according to claim 21, wherein the semantic information of the video image comprises any one of the following:
the preset object in the video image or global semantic information of the video image.

23. A video image transmission system, comprising a first video communication end and a second video communication end, wherein the first video communication end and the second video communication end are in a video communication connection;
the first video communication end is configured to:
acquire a captured video image,
determine an encoding mode, wherein the encoding mode comprises a preset object mode or a global semantic information mode;
recognize the preset object in the video image to obtain a sub-image of the preset object; and
provide the sub-image of the preset object into a trained neural network, wherein the trained neural network comprises an encoder comprising a series of one or more convolution layers and a middle layer to sequentially process the sub-image, and wherein the one or more convolution layers comprise a lower convolution layer whose output is fed to the middle layer;
execute the trained neural network to output a part of feature vectors extracted from the lower convolution layer and a low-dimensional vector from the middle layer, the low-dimensional vector representing semantic information of the preset object in the video image, and
send, through the video communication connection, the part of the feature vectors extracted from the lower convolution layer and the low-dimensional vector representing the semantic information to a second video communication end;
the second video communication end is configured to:
receive the semantic information and the part of feature vectors;
determine the encoding mode;
input the semantic information and the part of feature vectors into a pre-trained neural network;
execute the pre-trained neural network to output a reconstructed sub-image of the preset object;
obtain a reconstruction image of the video image; and
display the reconstruction image through a display screen of the second video communication end.

* * * * *